(12) United States Patent
Imura

(10) Patent No.: US 8,000,028 B2
(45) Date of Patent: Aug. 16, 2011

(54) LENS BARREL, AND CAMERA

(75) Inventor: Yoshio Imura, Kawasaki (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 12/450,574

(22) PCT Filed: Apr. 1, 2008

(86) PCT No.: PCT/JP2008/056496
§ 371 (c)(1),
(2), (4) Date: Apr. 2, 2010

(87) PCT Pub. No.: WO2008/126728
PCT Pub. Date: Oct. 23, 2008

(65) Prior Publication Data
US 2010/0202066 A1    Aug. 12, 2010

(30) Foreign Application Priority Data
Apr. 5, 2007  (JP) .................................. 2007-099699

(51) Int. Cl.
*G02B 15/14* (2006.01)
(52) U.S. Cl. ........................................ 359/694; 359/704
(58) Field of Classification Search ................... 359/817
See application file for complete search history.

(56) References Cited

U.S. PATENT DOCUMENTS

| 6,714,730 B2 * | 3/2004 | Horiuchi et al. ................ 396/72 |
| 2003/0180036 A1 * | 9/2003 | Horiuchi et al. ................ 396/72 |
| 2004/0042095 A1 | 3/2004 | Nomura |

FOREIGN PATENT DOCUMENTS

| JP | 2003-279828 | 10/2003 |
| JP | 2004-151710 | 5/2004 |
| JP | 2004-252365 | 9/2004 |
| JP | 2006-113418 | 4/2006 |

* cited by examiner

*Primary Examiner* — Ricky Mack
*Assistant Examiner* — James C Jones
(74) *Attorney, Agent, or Firm* — Staas & Halsey LLP

(57) ABSTRACT

Provided is a lens barrel, which can be further reduced by providing such a first helicoid as can be easily manufactured even in the zone of a small lead. The lens barrel (1) comprises a first barrel member (6) having a first helicoid (18, 25 and 26) formed in a first face (6a), and a second barrel member (21) having a second helicoid (24) formed in a second face (21a) confronting the first face (6a). The lens barrel is characterized in that the first barrel member (6) has, in the first face (6a), a first zone (Z1), in which the first helicoid (18, 25 and 26) has a first lead, and a second zone (Z2 and Z3), in which the first helicoid (18 and 25) has a second lead smaller than the first lead, and in that the first helicoid (18 and 25) having the second lead has a smaller thread number than that of the first helicoid (18, 25 and 26) having the first lead.

5 Claims, 10 Drawing Sheets

LENS BARREL, AND CAMERA

TECHNICAL FIELD

The present invention relates to a lens barrel having a helicoid structure and to a camera.

BACKGROUND ART

In the prior art, there is a lens barrel provided with a first cylinder provided with a helicoid, and a second cylinder provided with another helicoid which is screw-engaged with that helicoid. In this lens barrel, the second cylinder is inserted into the inner portion of the first cylinder, and by making the helicoid of the second cylinder move along the helicoid of the first cylinder by rotating the second cylinder with respect to the first cylinder, the second cylinder extends with respect to the first cylinder. Further, at the inner face of the first cylinder, regions having a plurality of differing leads of the helicoid are provided, and the extension speed can be regulated with respect to the rotation angle (for example, refer to Japanese Unexamined Patent Publication No. 2006-113418).

DISCLOSURE OF THE INVENTION

Problems to be Solved by the Invention

However, in a region where the lead is small, compared to a region where the lead is large, the pitch of the helicoid becomes small. In recent years the sizes of lens barrels have become miniaturized, along with the miniaturization of cameras. Because of this, when the pitch of the helicoid becomes small, the manufacture of the helicoid becomes difficult, making the miniaturization of the lens barrel difficult.

The object of the present invention is to provide a lens barrel which can be further miniaturized by providing a female helicoid which can be easily manufactured even in a region where the lead is small.

Means for Solving the Problems

The present invention solves the above problems by the following means. Moreover, in order to facilitate understanding, an explanation is given assigning reference numbers corresponding to the embodiments of the present invention, but the present invention is not limited thereby.

A lens barrel (1) according to the claim 1 comprising: a first cylinder (6) provided with a first helicoid (18, 25, 26) on a first face (6a); a second cylinder (21) provided with a second helicoid (24) on a second face (21a) facing the first face (6a); wherein the first cylinder (6), on the first face (6a), is provided with a first region (Z1) where the first helicoid (18, 25, 26) has a first lead, and a second region (Z2, Z3) where the first helicoid (18, 25) has a second lead smaller than the first lead, and a number of strips of the first helicoid (18, 25) having the second lead is smaller than a number of strips of the first helicoid (18, 25, 26) having the first lead.

The lens barrel (1) according to claim 1, wherein the first helicoid (18, 25, 26) comprises: a long helicoid (25) continuously formed in the first region (Z1) and the second region (Z2, Z3) and provided with a portion (18a) having the first lead, and a portion (18b, 18c) having the second lead, and a short helicoid (26) present only in the first region (Z1) and having only the first lead.

The lens barrel (1) according to claim 2, wherein: the second helicoid (24), in a state wherein it has been developed onto a planar surface, is provided with at least two groups of flank faces including two sides parallel to each other, in the first region (Z1), one group of the flank faces including two parallel sides (31a, 31b, 41a, 41b) of the second helicoid (24a, 24b) is respectively guided by a flank face (26c) of the short helicoid (26) and by a flank face (25f) of the portion (18a) having the first lead of the long helicoid (25), and in a transition region between the first region (Z1) and the second region (Z2, Z3), another group of flank faces including two parallel sides (30a, 30b, 40a, 40b) of the second helicoid (24a, 24b) is respectively guided by a flank face (25b, 25c, 25e, 25d) of the portion (18b, 18c) having the second lead of the long helicoid (25), and an end face (26a, 26b) of the short helicoid (26).

The lens barrel (1) according to any one of claims 1 to 3 wherein: the number of strips of the first helicoid (18) in the first region (Z1) is an integer multiple with respect to the number of strips of the first helicoid (18) in the second region (Z2, Z3).

The lens barrel (1) according to any one of claims 1 to 4 wherein: the second region (Z2, Z3), having mutually equivalent leads, is provided at both sides of the first region (Z1).

A camera (2) provided with the lens barrel (1) according to any one of claims 1 to 5.

Further, the constitutions explained with the assigned reference numbers may be further improved or may be at least partially substituted with other constituent elements. Further, in the present application, in order to facilitate the explanation, each helicoid is explained in the form of a developed drawing in a state where the cylinder on which the helicoid is provided has been developed. However, in actuality, the helicoids are formed on the face of the cylinder, and even though they are explained in the form of a developed drawing, the helicoids in the present application mean helicoids provided on the face of a cylinder.

Effects of the Invention

According to the present invention, it is possible to provide a lens barrel having a helicoid which is easy to manufacture even in a region where the lead is small.

EXPLANATION OF REFERENCE NUMERALS

1: lens barrel, 6: fixed cylinder, 6a: inner peripheral face, 18: female helicoid, 21: first moving cylinder, 21a: outer peripheral face, 24: male helicoid, 25: long female helicoid, 26: short female helicoid, Z1: extension region, Z2: wide-tele region, Z3: collapsed region

PREFERRED MODE FOR CARRYING OUT THE INVENTION

Below, the lens barrel of an embodiment of the present invention is explained with reference to the drawings and the like. In each drawing, the direction facing the object side along the optical axis A is the z plus direction. Further, the lens barrel of the present embodiment is a collapsible lens barrel which changes its overall length in the optical axis direction, for example, when photographing and not photographing.

Figure 1:
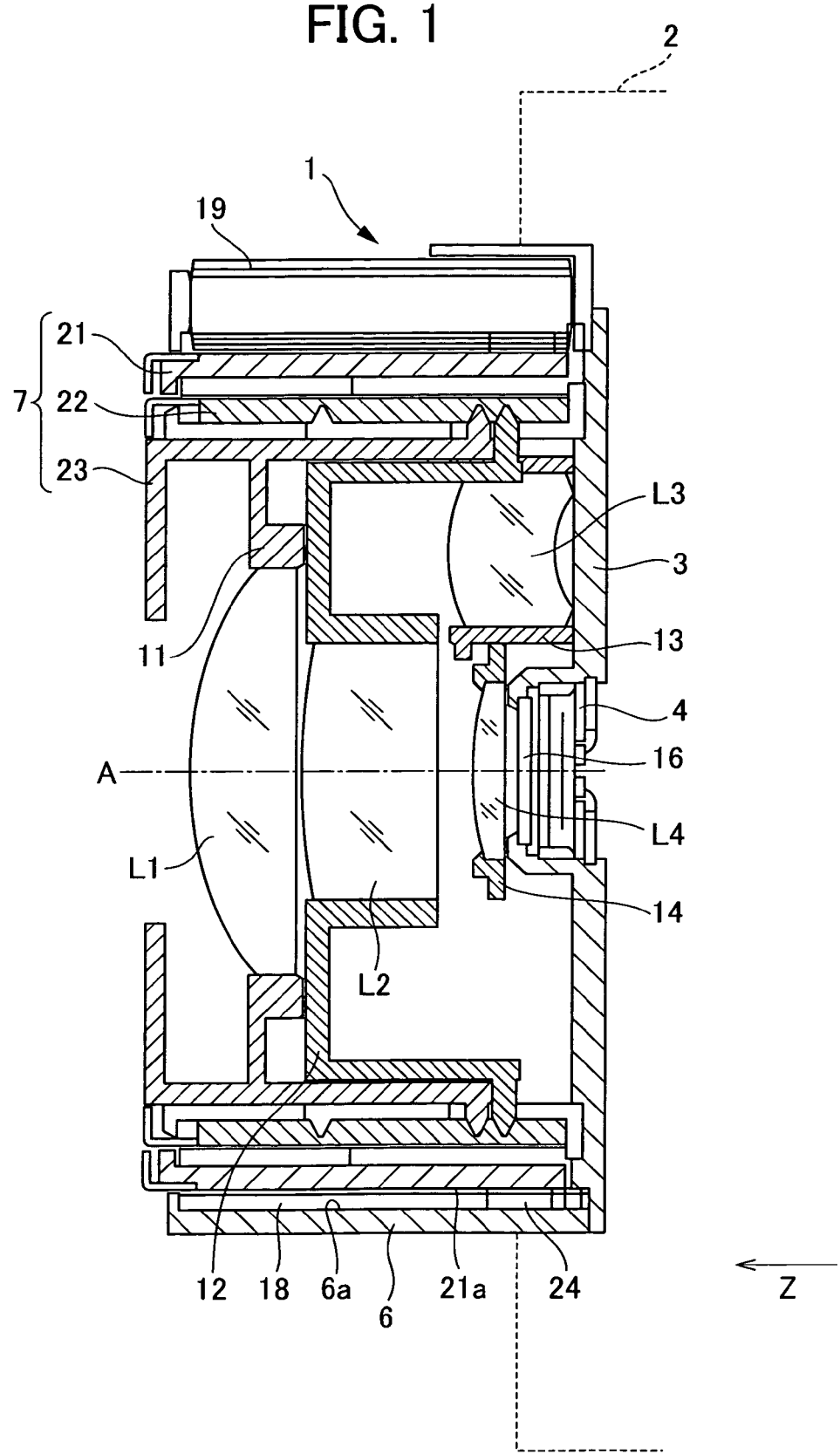
FIG. 1 is a cross section of a collapsed state of the lens barrel of an embodiment of the present invention.
Figure 2:
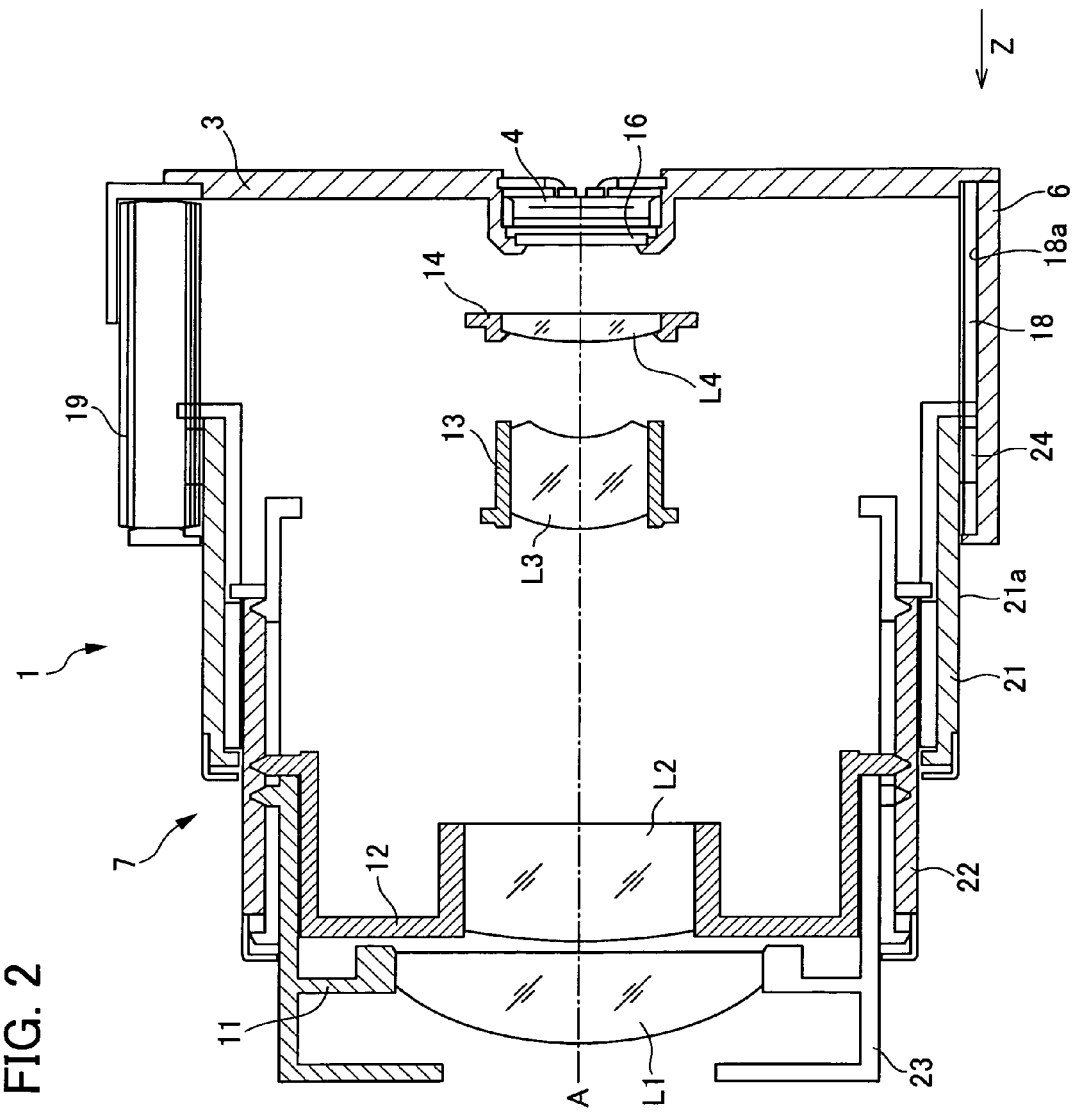
FIG. 2 is a cross section of the wide state of the lens barrel of an embodiment of the present invention.
Figure 3:
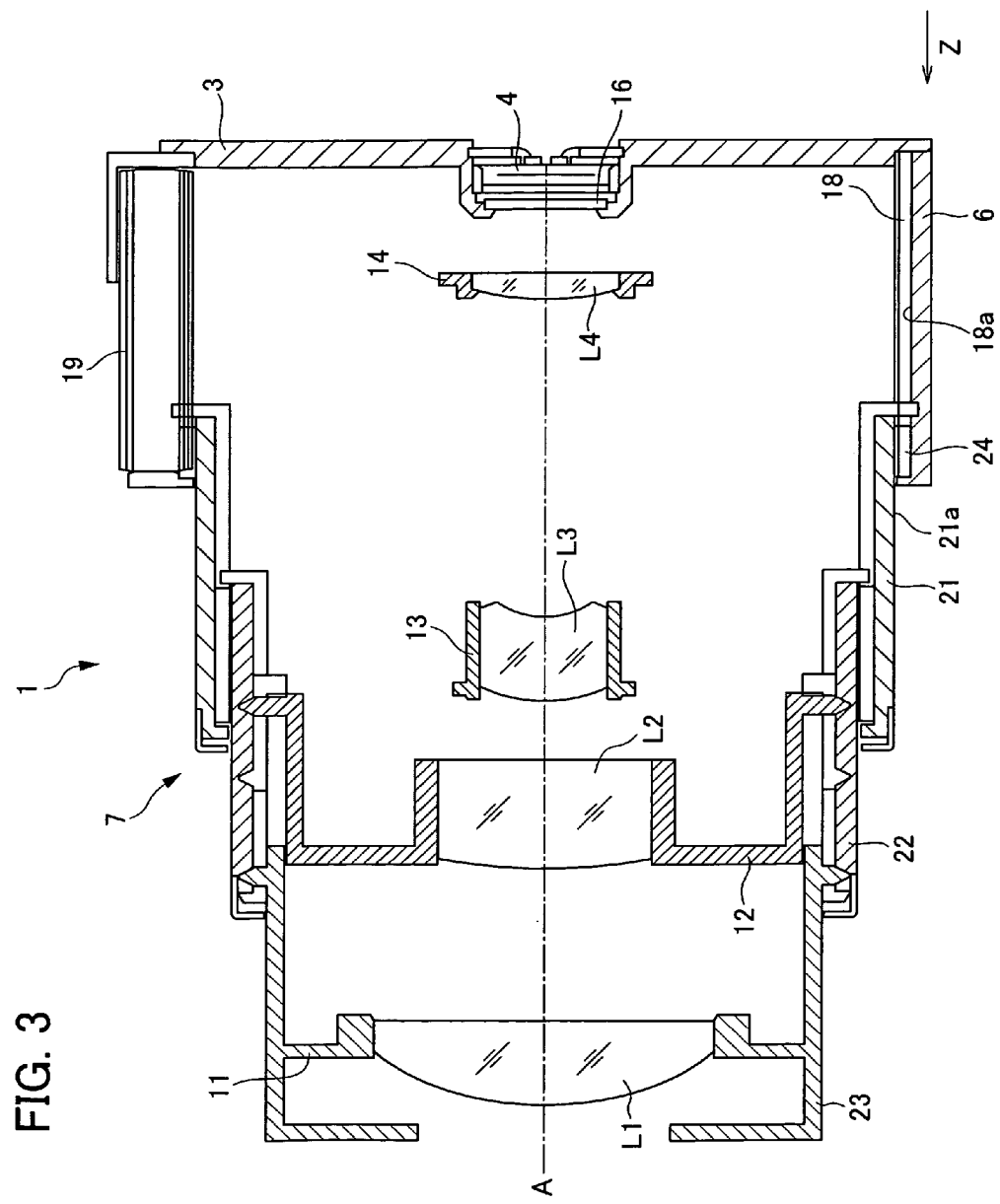
FIG. 3 is a cross section of the tele state of the lens barrel of an embodiment of the present invention.

First, the overall constitution of the lens barrel 1 will be explained. FIGS. 1 to 3 are drawings showing the lens barrel 1; FIG. 1 is a cross section in the collapsed state of the lens barrel 1, FIG. 2 is a cross section in the wide state of the lens barrel 1, and FIG. 3 is a cross section in the tele state of the lens barrel 1.

The lens barrel 1, in addition to being provided with a first lens group L1, a second lens group L2, a third lens group L3, and a fourth lens group L4 which form a four group zoom lens at the image side of the lens barrel 1, is also provided with a CCD support 3 fixed to the main body of the camera 2 and a CCD 4 positioned in its center, a fixed cylinder 6 fixed to the CCD support 3, and a moving cylinder 7 (21, 22, 23) extensible from the fixed cylinder 6 towards the object side. The lens barrel 1 is further provided with a first holding portion 11 which holds the above described first lens group L1, a second holding portion 12 which holds the second lens group L2, a third holding portion 13 which holds the third lens group L3, and a fourth holding portion 14 which holds the fourth lens group.

The first lens group L1, second lens group L2, third lens group L3 and fourth lens group L4, as mentioned above, form a four group zoom lens. In FIGS. 2 and 3, in the state wherein the lens groups L1 to L4 are in the extended state, they are positioned in the order of the first lens group L1, the second lens group L2, the third lens group L3, and the fourth lens group L4, from the object side towards the image side along the optical axis A direction. Further, in the collapsed state in FIG. 1, the third lens group L3 is withdrawn to approximately the same position as the fourth lens group L4, above the optical axis A.

The CCD support 3 is positioned at the image side end portion of the lens barrel 1, and is an approximately disc shaped member which holds the CCD 4 approximately in its center portion. The CCD 4 is an optical-electrical conversion element which converts object light which has passed through the above mentioned lens groups L1 to L4 into an electric signal. The CCD 4 is positioned at the exit side of the fourth lens group L4, and between the CCD4 and the fourth lens group L4 a low pass filter (LPF) 16 is provided to reduce moire.

The fixed cylinder 6 is a cylinder having its image side end portion fixed to the CCD support 3. At the inner peripheral face 6a of the fixed cylinder 6, a later described female helicoid 18 is provided, and further, a gear 19 which is coupled to a driving source (not illustrated) is positioned at one part of the fixed cylinder 6.

The moving cylinder 7 includes a first moving cylinder 21, second moving cylinder 22, and third moving cylinder 23 which are extensible from the fixed cylinder 6. The first moving cylinder 21 is a cylinder which is stored in the inner diameter side of the fixed cylinder 6, obtains rotating power from the gear 19 which is rotated by the above mentioned, not illustrated, driving source, and is driven in the optical axis A direction with respect to the fixed cylinder 6. The later explained male helicoid 24 is provided at the outer peripheral face 21a of this first moving cylinder 21. The second moving cylinder 22 is a cylinder which is accommodated at the inner diameter side of the first moving cylinder 21, and is capable of advancing and retreating along the optical axis direction with respect to the first moving cylinder 21. The third moving cylinder 23 is a cylinder which is accommodated in the inner diameter side of the second moving cylinder 22, and is capable of advancing and retreating along the optical axis direction with respect to the second moving cylinder 22.

The first holding portion 11 is an annular frame which holds the first lens group L1 in its inner diameter side, and is provided in the vicinity of the end portion of the object side of the optical axis direction of the third moving cylinder 23. The second holding portion 12 is a part which supports the second lens group L2 and is inserted in the inner diameter side of the third moving cylinder 23. The second holding portion 12 is provided with a well-known vibration reduction device, not illustrated, which reduces image blur of the image imaged at the imaging face of the CCD 4 by driving the second lens group L2 in a plane parallel to the optical axis A according to a publicly known vibration reduction control. The third holding portion 13 supports the third lens group 3.

Figure 4:
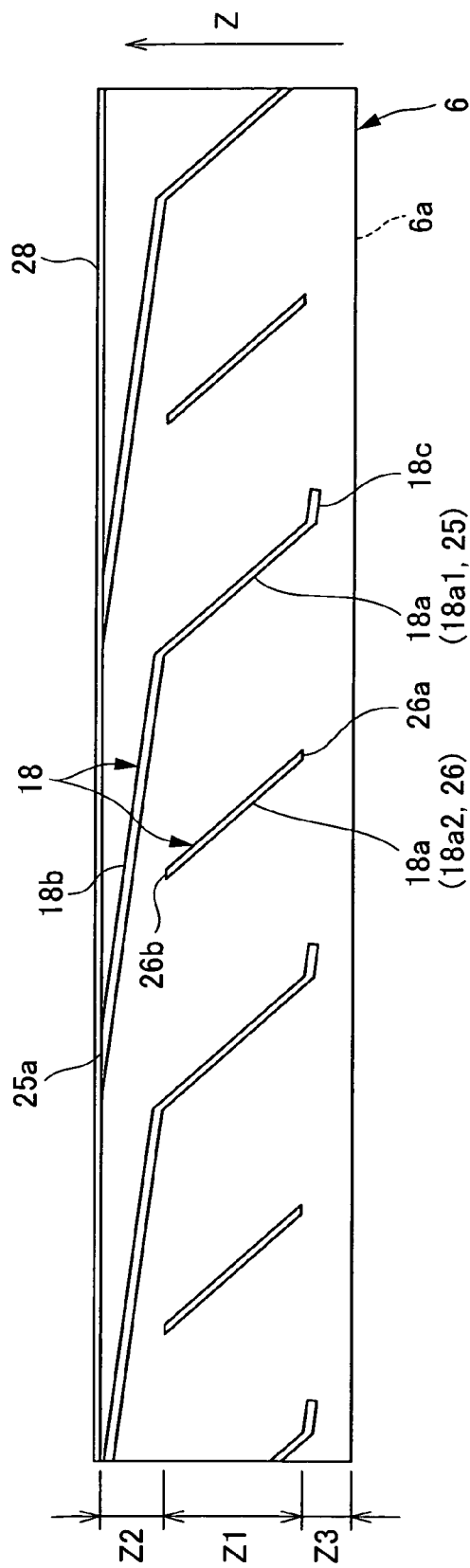
FIG. 4 is a developed view seen from the outside of a fixed cylinder where the female helicoid is provided.

Next, the female helicoid 18 and the fixed cylinder 6 will be described in detail. FIG. 4 is a perspective view of the fixed cylinder 6 on which the female helicoid 18 is provided, developed and seen from the outside. Further, for ease of explanation, the female helicoid 18 is shown by solid lines. The upper side in the drawing (the z plus side) is the object side, and the lower side (the z minus side) is the image side. Further, in the following, concerning the shapes of the female helicoid 18 and the male helicoid 24, they are explained with regard to the shapes in these developed drawings without being particularly limited thereto.

The fixed cylinder 6, in the central portion of its inner peripheral face 6a, is provided with an extension region Z1 provided with a six strip female helicoid 18a having a first lead, provided at 60 degree intervals to each other in the peripheral direction; and, positioned at an object side thereof, a wide-tele region Z2 provided with a three strip female helicoid 18b having a second lead smaller than the first lead and provided at 120 degree intervals to each other in the peripheral direction; and, positioned at the image side of the extension region Z1, a collapsed region Z3 provided with a female helicoid 18c having a second lead the same as the wide-tele region Z2 and smaller than the first lead, provided at 120 degree intervals to each other.

Of the six strips of the female helicoid 18a of the extension region Z1, a three strip female helicoid 18a1 formed by every other strip is connected at one end thereof to the three strip female helicoid 18b of the wide-tele region Z2, and the other end is connected to the three strip female helicoid 18c of the collapsed region Z3, forming a three strip long female helicoid 25 having a shape of a straight line which is bent in two places in the developed drawing. Further, of the six strips of the female helicoid 18a of the extension region Z1, another female helicoid 18a2 is not connected to the female helicoids 18b or 18c of the wide-tele region Z2 or the collapsed region Z3, and forms a three strip short female helicoid 26 having a straight line shape in the developed drawing.

The end face 26a of the image side (z minus side in the drawing) of the short helicoid 26 has the same slope as the second lead of the part 18c of the collapsed region Z3 of the long female helicoid 25, namely, it is parallel to the part 18c in the developed drawing. Further, the end face 26b of the object side (z plus side in the drawing) of the short helicoid 26 also has the same slope as the second lead of the part 18b of the wide-tele region Z2 of the long female helicoid 25, namely, it is parallel to the part 18b in the developed drawing. Furthermore, at the object side (z plus side in the drawing) of the inner peripheral face 6a of the fixed cylinder 6, a rib portion 28 is provided along the edge of the fixed cylinder 6.

The object side (z plus side in the drawing) end face 25a of the long female helicoid 25 is formed so as to run along the rib 28 and contacts the rib 28.

Figure 5:
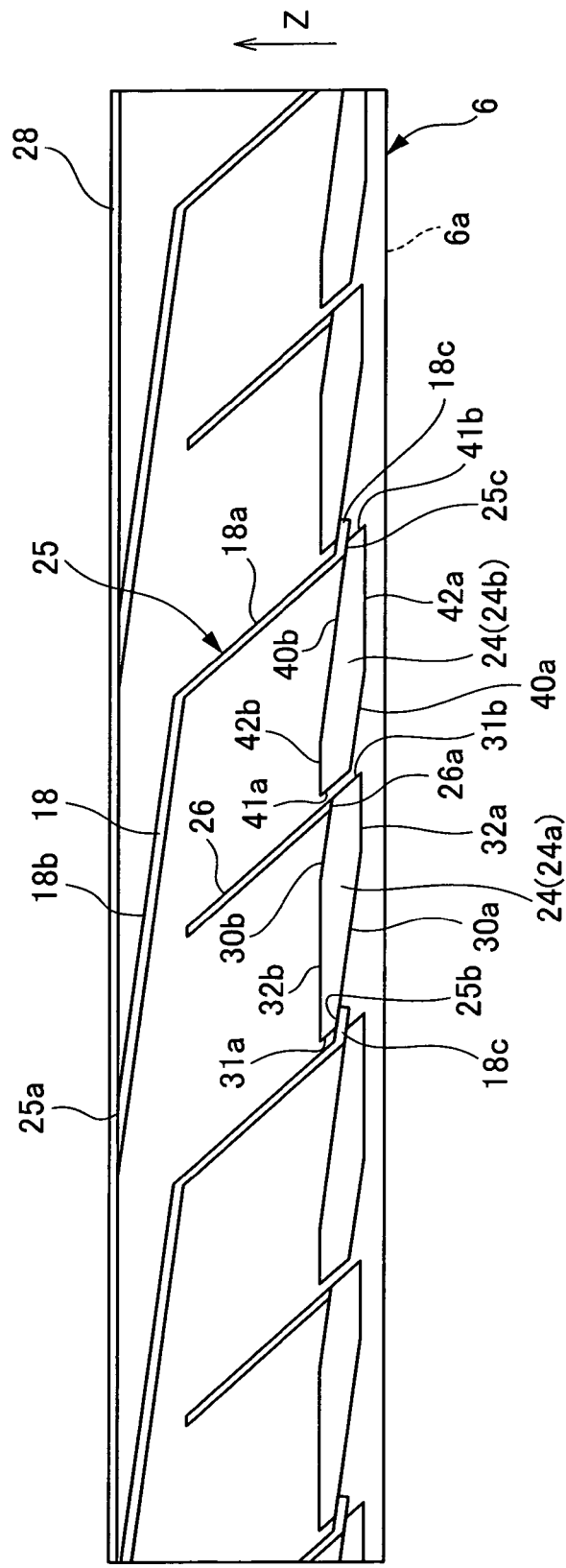
FIG. 5 is a drawing showing the screw-engaged state of the female helicoid and the male helicoid in the collapsed state.

Next, the male helicoid 24 is described in detail. FIG. 5 is a drawing showing the male helicoid 24 in a screw-engaged state with the female helicoid 18, in the collapsed state. The male helicoid 24 is provided with 6 strips so as to have 60 degree intervals with respect to each other at the inner peripheral face 6a. From every other one of these strips, a male helicoid 24a is formed, which in the developed drawing is a narrow hexagon elongated in the peripheral direction, enclosed by three sets of mutually parallel straight lines (namely, helical lines having equivalent leads to each other on the actual cylinder) 30a and 30b; 31a and 31b; and 32a and 32b. Further, the male helicoids 24b are also, in the developed drawing, narrow hexagons elongated in the peripheral direction, enclosed by three groups of mutually parallel straight lines (namely, helical lines having equivalent leads to each other on the actual cylinder) 40a and 40b; 41a and 41b; and 42a and 42b. Among these, the straight lines 31a, 31b, and straight lines 41a, 41b are parallel in the developed drawing to the female helicoid 18a of the extension region Z1 (namely, have equivalent mutual leads on the actual cylinder). Further, the straight lines 30a, 30b, and straight lines 40a and 40b are parallel in the developed drawing to the female helicoids 18b and 18c of the wide-tele region Z2 and the collapsed region Z3 (namely, have mutually equivalent leads on the actual cylinder). Furthermore, the mutually parallel straight lines in the developed drawing (namely, helical lines having equivalent leads to each other on the actual cylinder) 32a, 32b, and 42a, 42b, are parallel to the end portion of the fixed cylinder 6, namely, to the rib portion 28. And, the adjacent male helicoids 24a and 24b have the same shape, and are disposed so as to have point symmetry with respect to each other.

The distance between the straight lines 31a and 31b, and the distance between the straight lines 41a and 41b of the male helicoids 24a and 24b, is slightly smaller than the distance in the extension region Z1 between the long female helicoid 25 (18a) and the short female helicoid 25, namely, slightly smaller than the pitch. Further, the distance between the mutually parallel straight lines (namely, helical lines having equivalent leads to each other on the actual cylinder) 30a and 30b in the developed drawing, and the distance between the mutually parallel straight lines (namely, helical lines having equivalent leads to each other on the actual cylinder) 40a and 40b in the developed drawing, of the male helicoids 24a and 24b, is slightly smaller than the distance between the long female helicoids 25 (18b) in the wide-tele region Z2, namely, slightly smaller than the pitch.

Next, the operation of the lens barrel 1 is explained. As shown in FIG. 5, in the collapsed state, for the male helicoids 24a which are every other one of the six male helicoids 24, the image side flank face including the line 30a contacts the object side flank face 25b of the part 18c having a second lead in the collapsed region Z3 of the long female helicoid 25. Further, the object side flank face including the line 30b contacts the image side end face 26a of the short female helicoid 26. The object side flank face including the straight line 40b of the other male helicoid 24b contacts the image side flank face 25c of the part 18c having the second lead in the collapsed region Z3 of the long female helicoid 25.

Figure 6:
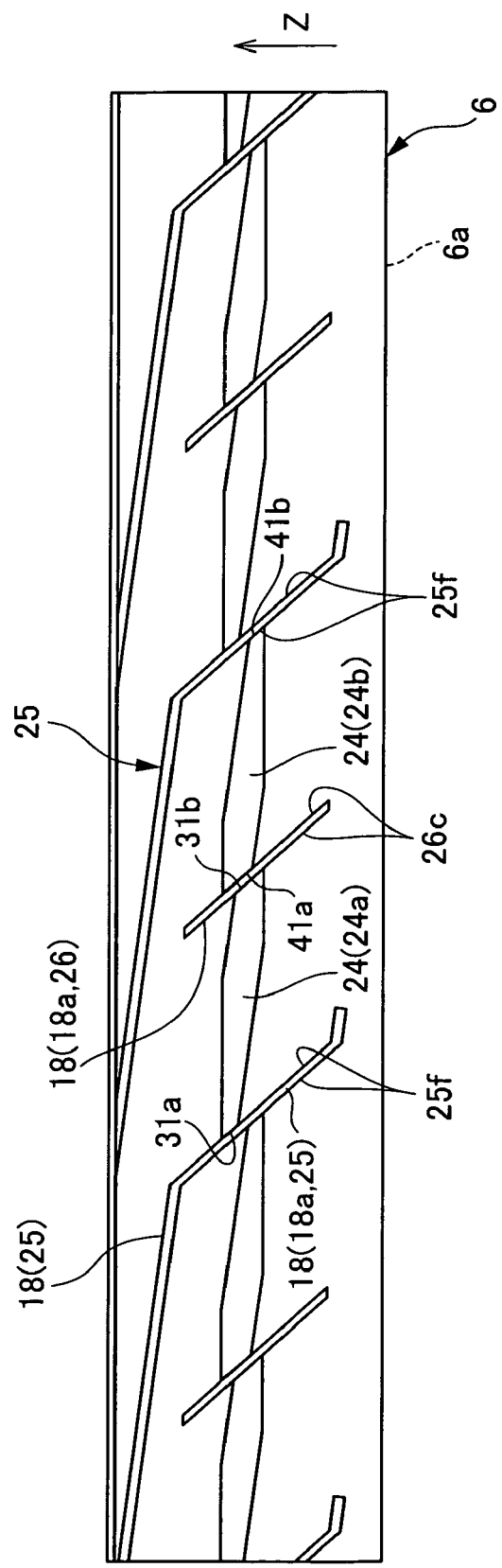
FIG. 6 is a drawing showing the screw-engaged state of the female helicoid and the male helicoid when the lens barrel is at a position along the extension from the collapsed state to the wide position.
Figure 7:
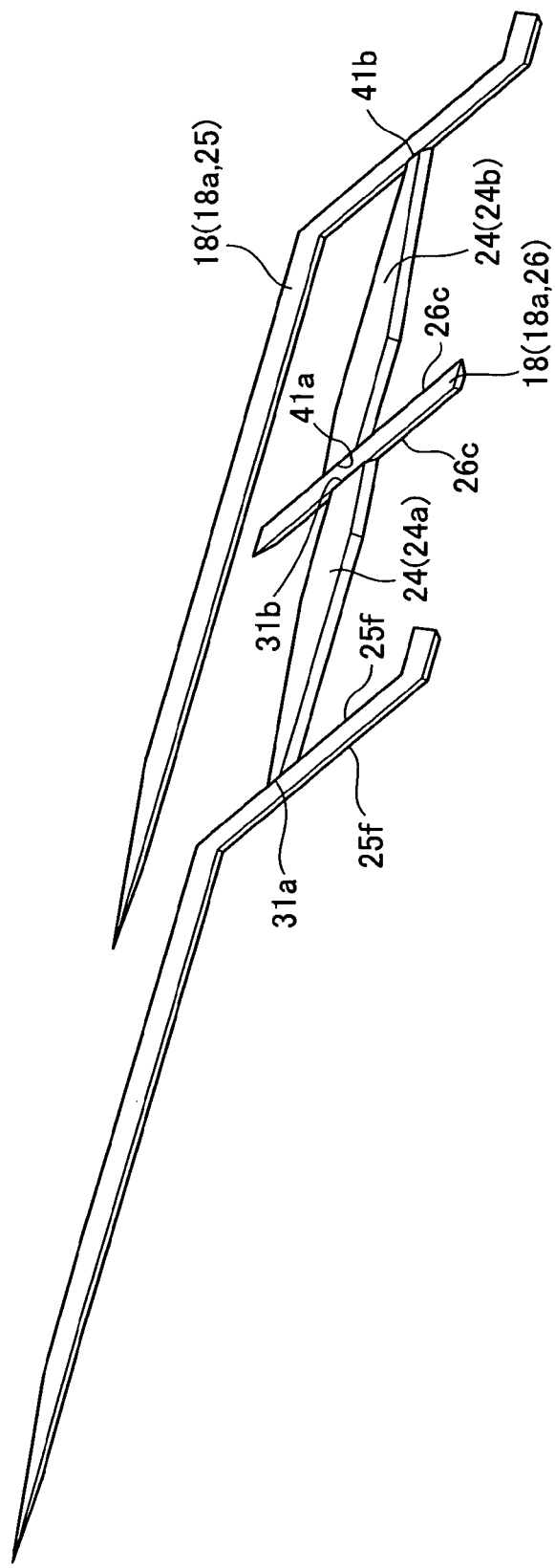
FIG. 7 is an oblique view of the state in FIG. 6.

When the power switch, not illustrated, is operated to "ON" in the collapsed state, the gear 19 shown in FIG. 1 is rotated by the driving source. Thus, the first moving cylinder 21 begins to rotate with respect to the fixed cylinder 6. FIG. 6 is a drawing showing a screw-engaged state of the female helicoid 18 and the male helicoid 24 at an intermediate point in the extension of the lens barrel from the collapsed state to the wide position. FIG. 7 is a drawing showing an oblique view of the same. As shown in the drawings, the flank faces of the male helicoid 24a including one group of straight lines 31a and 31b parallel to each other in the developed drawing (namely, helical lines having equivalent leads to each other on the actual cylinder), are respectively guided by the flank face 25f of the part 18a in the extension region Z1 of the long female helicoid 25, and the flank face 26c of the short female helicoid 26. Further, the flank faces of the male helicoid 24b including one group of straight lines 41a and 41b parallel to each other in the developed drawing (namely, helical lines having equivalent leads to each other on the actual cylinder), are respectively guided by the flank face 25f of the part 18a in the extension region Z1 of the long female helicoid 25, and the flank face 26c of the short female helicoid 26. Thus, the first moving cylinder 21 extends in the object direction (the z direction in the drawing) with respect to the fixed cylinder 6, by the rotation of the first moving cylinder 21. At this time, because, in the extension region Z1, the first lead of the female helicoid 18 (18a) is greater than the second lead of the collapsed region Z3, the moving distance in the optical axis A direction of the first moving cylinder 21 is greater than in the collapsed region Z3 even when the amount of rotation is the same.

Figure 8:
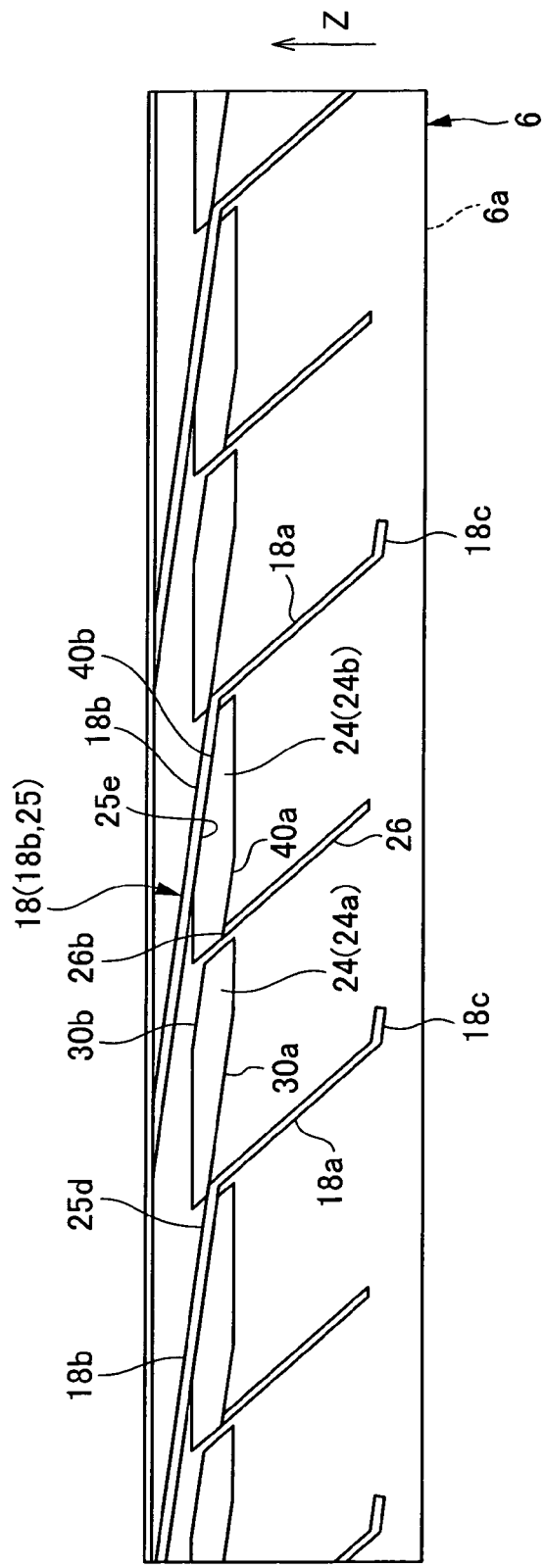
FIG. 8 is a drawing showing the screw-engaged state of the female helicoid and the male helicoid in the wide state.
Figure 9:
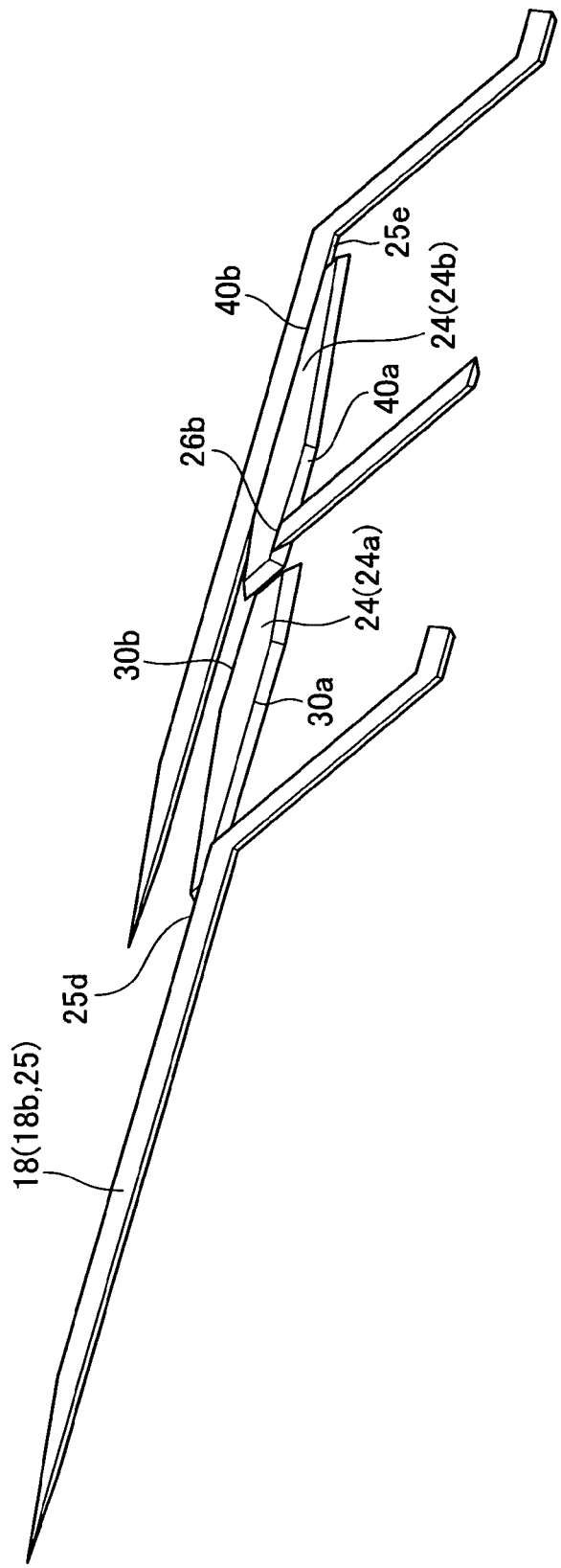
FIG. 9 is an oblique view of the state in FIG. 8.

FIG. 8 is a drawing showing the screw-engaged state of the female helicoid 18 and the male helicoid 24 shown in the wide state in FIG. 2, and FIG. 9 is an oblique view showing the same. As shown in the drawing, the image side flank face of the male helicoid 24a including the straight line 30a contacts the flank face 25d of the object side of the long female helicoid 25. Further, the flank face of the object side of the male helicoid 24b including the straight line 40b contacts the image side flank face 25e of the long female helicoid 25, and the image side flank face including the line 40a contacts the object side end 26b of the short female helicoid 26.

In this way, when the male helicoid 24 is extended and transit to the wide state, the screw-engagement of the six strips of the female helicoid 18 becomes a screw-engagement of three strips, but the transition from the extension region Z1 to the wide-tele region Z2 is carried out smoothly because the male helicoid 24a contacts and is guided by the object side flank face 25d of the long female helicoid 25; and the male helicoid 24b contacts and is guided by the object side end face 26b of the short female helicoid and the image side flank face 25e of the long female helicoid 25.

Figure 10:
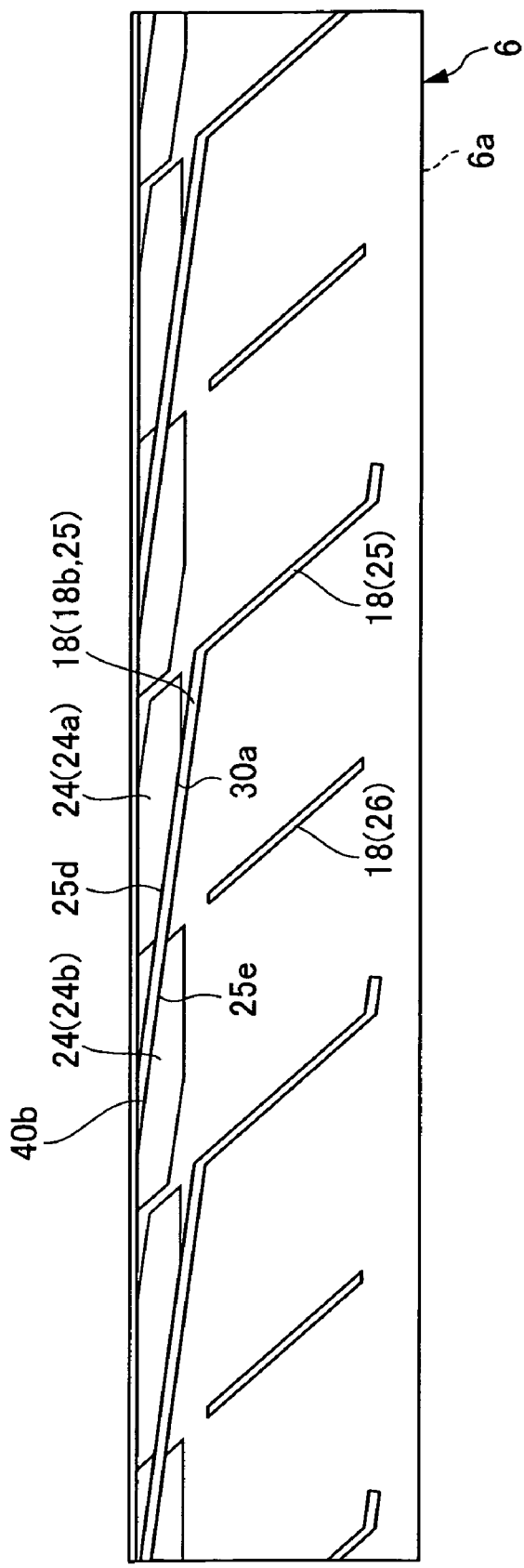
FIG. 10 is a drawing showing the screw-engaged state of the female helicoid and the male helicoid in the tele state.

FIG. 10 is a drawing showing the screw-engaged state of the female helicoid 18 and the male helicoid 24 in the tele state shown in FIG. 3. As shown in the drawing, the image side flank face of the male helicoid 24a including the straight line 30a contacts the object side flank face 25d of the part 18b of the wide-tele region Z2 of the long female helicoid 25, and the object side flank face of the male helicoid 24b including the straight line 40b contacts the image side flank face 25e of the part 18b of the wide-tele region Z2 of the long female helicoid 25.

In this way, in the wide-tele region Z2, because the second lead of the female helicoid 18 is smaller than the first lead of the extension region Z1, the moving distance in the optical axis A direction with respect to the rotation amount of the first moving cylinder 21 is small compared to that of the extension region Z1. At the tele end portion, because a rib portion 28 is provided at the inner peripheral face 6a of the fixed cylinder 6, the male helicoid 24 is restrained by the rib portion 28, and there can be no separation of the first moving cylinder 21 from the fixed cylinder 6.

The effects provided by the above embodiments of the present invention are as follows.

(1) At the inner peripheral face 6a of the fixed cylinder 6, a female helicoid 18 is provided with an extension region Z1 having a first lead, and a collapsed region Z3 and a wide-tele region Z2 having a second lead; the number of strips of the female helicoid 18 in the collapsed region Z3 and the wide-tele region Z2 having the second lead is three, which is smaller than the six strips of the female helicoid in the extension region Z1 having the first lead. In this way, in the regions where the lead is small such as the wide-tele region Z2 and the collapsed region Z3 where the pitch of the female helicoid 18 becomes narrow, the number of strips of the female helicoid 18 decreases from six to three, and therefore the lens barrel 1 can be easily manufactured even when it is miniaturized. Further, because the number of strips of the female helicoid 18 becomes small, the number of female helicoids 18 to be formed in a limited space is reduced, and thus the female helicoid 18 can be formed with a greater width. Furthermore, because there is more leeway with the space, the width of the male helicoid 24 can also be increased. Accordingly, the strength of the helicoid can be improved regarding the case of the application of a force in the direction of the optical axis.

(2) There is a smaller number of strips in the collapsed region Z3 and the wide-tele region Z2 where the lead is small. However, the end faces 26a and 26b of the short female helicoid are used and the male helicoid 24 is guided by these end faces 26a and 26b and the long female helicoid 25 when transiting from the extension region Z1. Therefore, stable transition is possible even though the strip number is small.

Modifications

Without being limited to the embodiments explained above, various modifications and changes are possible, and these also fall within the scope of the present invention.

(1) In the present embodiment, the female helicoid 18 is formed on the inner peripheral face 6a of the fixed cylinder 6, and the male helicoid 24 is formed on the outer peripheral face 21a of the first moving cylinder 21, but this is not a limitation. For example, both of the cylinders may be moving cylinders. It is also possible to form the male helicoid on an inner peripheral face, and the female helicoid on an outer peripheral face.

(2) In the present embodiment, the female helicoid is constituted to have three strips in the collapsed region Z3 and the wide-tele region Z2, and six strips in the extension region Z1, but this is not a limitation. For example, it can be constituted to have four strips in the collapsed region Z3 and wide-tele region Z2, and eight strips in the extension region Z1, or the like. Further, the relationship between the number of strips of the helicoid, for the regions where it is small, and the regions where it is large, does not have be 1:2, and may be 2:3 or another ratio.

(3) Further, in the present embodiment, in the collapsed region Z3 and the wide-tele region Z2 the end faces 26a and 26b of the short female helicoid 26 were used, but this is not a limitation, and the constitution may be such that the male helicoid 24 is guided only by the long female helicoid 25.

(4) In the present embodiment, the male helicoids 24a and 24b of the male helicoid 24 which are adjacent to each other have point symmetry with respect to each other, but this is not a limitation, and provided that they have a form so as to be guided by the female helicoid 18, they do not have to have point symmetry.

The invention claimed is:

1. A lens barrel comprising:
a first cylinder provided with a first cylinder side helicoid on a first face; and
a second cylinder provided with a second cylinder side helicoid on a second face facing the first face; wherein
the first cylinder side helicoid has a first lead formed at a first region, and a second lead, smaller than the first lead, formed at a second region, and a number of the second leads of the first cylinder side helicoid is smaller than a number of the first leads of the first cylinder side helicoid,
the first cylinder helicoid is configured with a first helicoid continuously formed in the first region and the second region and provided with the first lead and the second lead, and a second helicoid having only the first lead,
the second cylinder side helicoid, in a state where it has been developed into a planar surface, is provided with at least two groups of flank faces including two sides parallel to each other,
in the first region, one group of the flank faces including two parallel side of the second cylinder side helicoid is respectively guides by a flank face of the second helicoid and a flank face of the portion having the first lead of the first cylinder side helicoid, and
in a transition region between the first and second regions, another group of flank faces including two parallel sides of the second cylinder side helicoid is respectively guided by a flank face of the portion having the second lead of the first helicoid, and by an end face of the second helicoid.

2. The lens barrel according to claim 1, wherein:
the number of the first leads of the first cylinder side helicoid is an integral multiple of the number of the second leads of the first cylinder side helicoid.

3. The lens barrel according to claim 1, wherein: the first helicoid is provided with the second region, having mutually equivalent leads, at either side of the first region.

4. A camera provided with the lens barrel according to claim 1.

5. A lens barrel comprising:
a first cylinder provided with a first cylinder side helicoid on a first face, and
a second cylinder provided with a second cylinder side helicoid on a second face facing the first face; wherein
the first cylinder side helicoid has a first lead formed at a first region, and a second lead, smaller that the first lead, formed at a second region, and a number of the second leads of the first cylinder side helicoid is smaller than a number of the first leads of the first cylinder side helicoid,
the first cylinder side helicoid is configured with a first helicoid formed in the first region and the second region and provided with the first lead and the second lead, and a second helicoid having only the first lead,
the second cylinder side helicoid, in a state where it has been developed onto a planar surface, is provided with at least two groups of side faces including two sides parallel to each other,
in the first region, one group of the side faces including two parallel sides of the second cylinder side helicoid is respectively guided by a side face of the second helicoid and by a side face of the portion having the first lead of the first cylinder side helicoid, and
in a transition region between the first region and the second region, another group of side faces including two parallel sides of the second cylinder side helicoid is respectively guided by a side face of the portion having the second lead of the first helicoid, and by an end face of the second helicoid.

* * * * *

UNITED STATES PATENT AND TRADEMARK OFFICE
CERTIFICATE OF CORRECTION

| | |
|---|---|
| PATENT NO. | : 8,000,028 B2 |
| APPLICATION NO. | : 12/450574 |
| DATED | : August 16, 2011 |
| INVENTOR(S) | : Yoshio Imura |

It is certified that error appears in the above-identified patent and that said Letters Patent is hereby corrected as shown below:

Column 7, Line 59, In Claim 1, delete "face;" and insert -- face, --, therefor.
Column 8, Line 28-30 (Approx.), delete Claim 3 "3. The lens barrel according to claim 1, wherein: the first helicoid is provided with the second region, having mutually equivalent leads, at either side of the first region."

and insert new claim 3

-- 3. The lens barrel according to claim 1, wherein:
the first helicoid is provided with the second region, having mutually equivalent leads, at either side of the first region. --, therefor.

Signed and Sealed this
Fourth Day of September, 2012

David J. Kappos
*Director of the United States Patent and Trademark Office*